Figure 1:
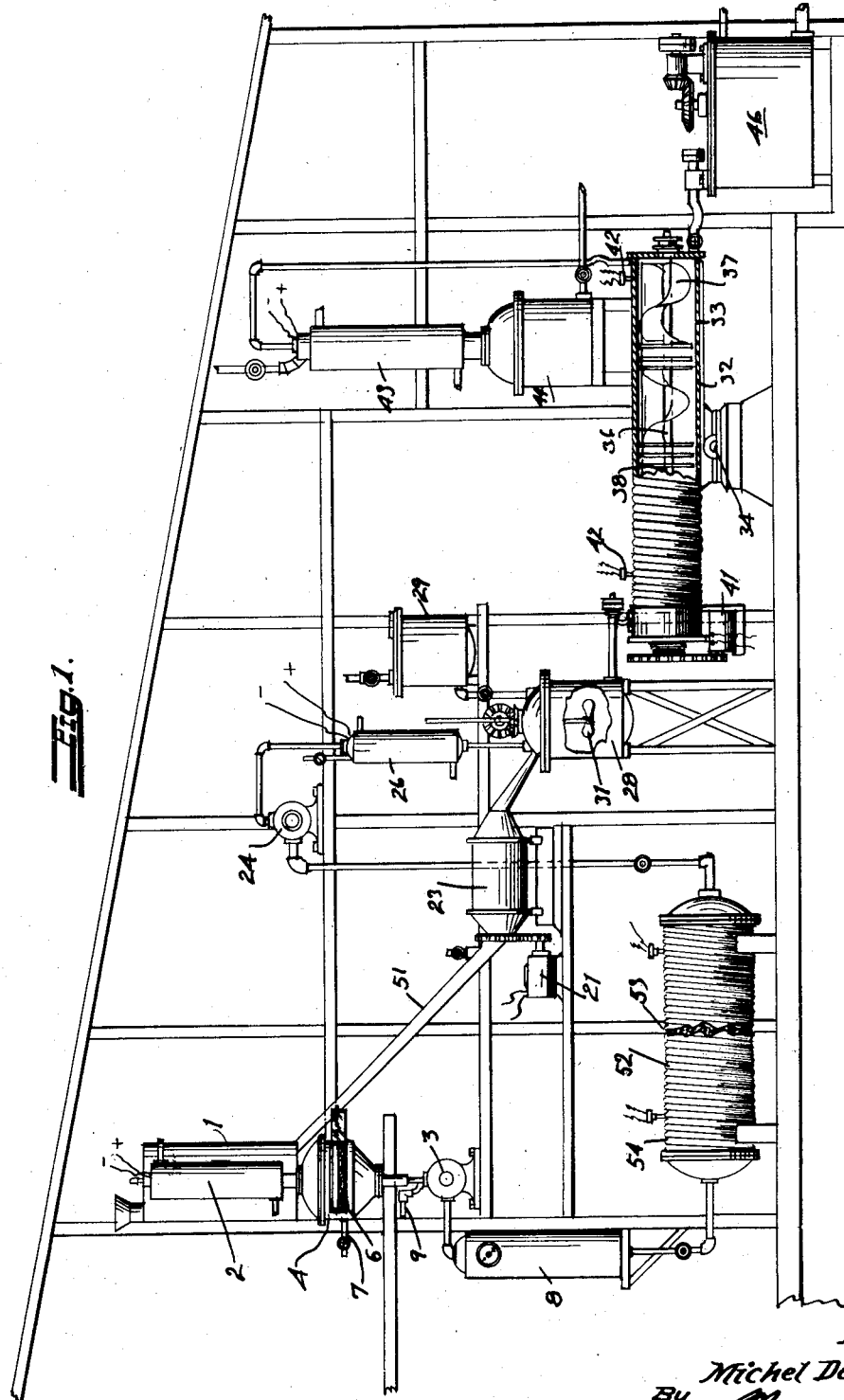

Dec. 22, 1925.

M. DE KEYSER 1,566,379

PROCESS OF TREATING SULPHIDE ORES AND CONCENTRATES

Filed July 21, 1922

2 Sheets-Sheet 1

INVENTOR
Michel De Keyser
By
ATTORNEYS

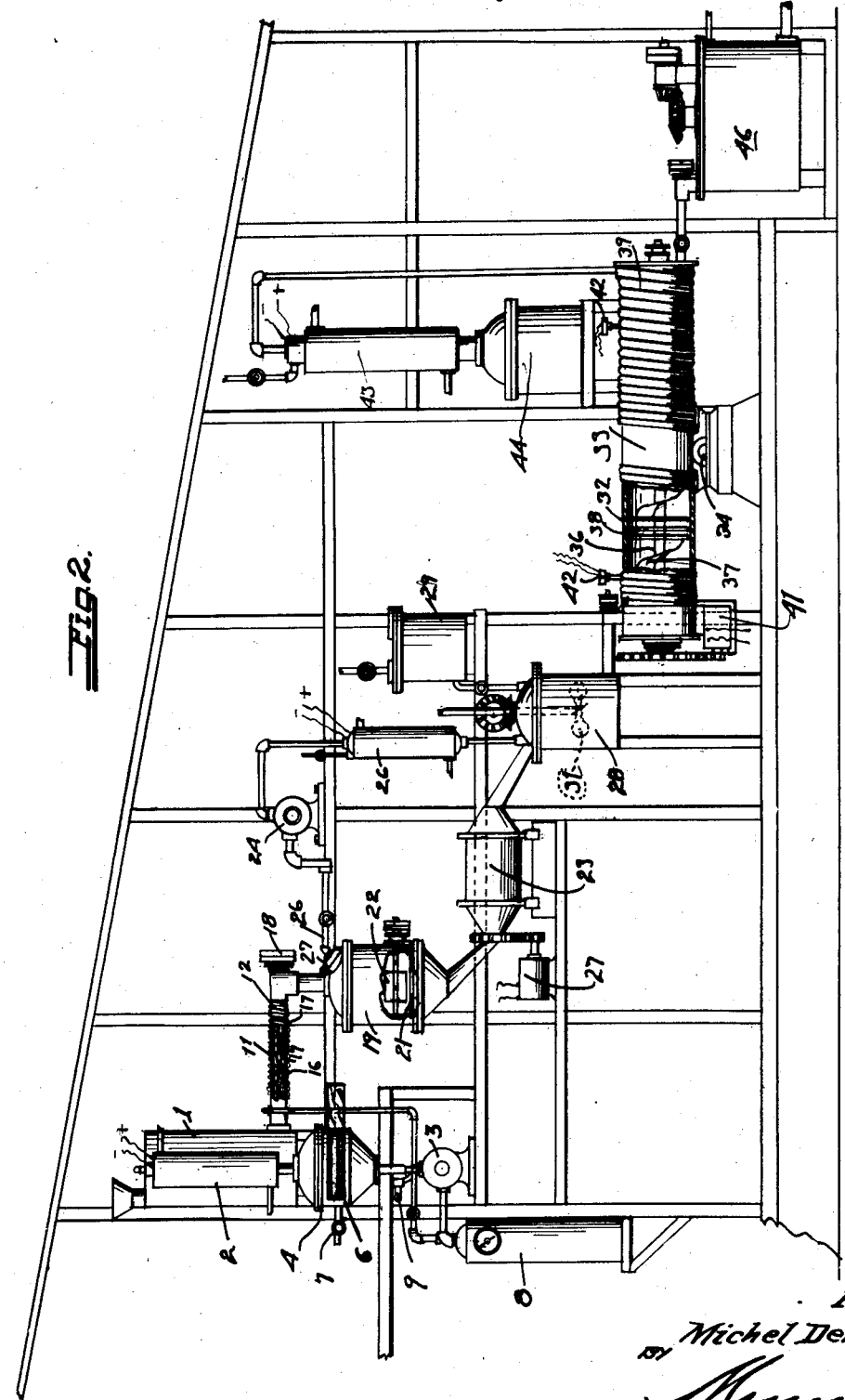

Patented Dec. 22, 1925.

1,566,379

UNITED STATES PATENT OFFICE.

MICHEL DE KEYSER, OF OAKLAND, CALIFORNIA.

PROCESS OF TREATING SULPHIDE ORES AND CONCENTRATES.

Application filed July 21, 1922. Serial No. 576,499.

*To all whom it may concern:*

Be it known that I, MICHEL DE KEYSER, a citizen of the Dominion of Canada, and a resident of Oakland, county of Alameda, and State of California, have invented a new and useful Process of Treating Sulphide Ores and Concentrates, of which the following is a specification.

The present invention relates to improvements in means for treating sulphide ores and concentrates and for extracting the various ingredients in their metallic or salt form in one continuous process. It is proposed to utilize for the purpose sulphuric acid which is first produced from the ore or the concentrates in the same process by the introduction of highly concentrated ozone. A further feature of the present invention is an adjustable sulphatizer adapted to receive a proper mixture of concentrates and sulphuric acid and to transform sulphides into sulphates most of which are soluble in water and readily changed into commercial products if submitted to further treatment. Other features and advantages of my process and various structural details will appear as the specification proceeds.

With these objects in mind I have illustrated the preferred form of my invention in the accompanying drawing in which Figure 1 represents an illustration of one arrangement of structural units for the carrying out of the process while Figure 2 represents a modified form of this arrangement.

While I have shown only the preferred forms of the arrangement it should be understood that various changes or modifications may be made within the scope of the claims hereto attached without departing from the spirit of the invention.

The ore which is preferably concentrated and reduced to 30 mesh or finer is first introduced into the continuous roasting furnace (1), using a temperature of preferably 1200° F. The fumes rising from the ore or pulp are guided into the Cottrell precipitator (2) which is well known in the art and which separates the suspended matter and the arsenic from the sulphur dioxide ($SO_2$). A blower (3) draws the contents of the precipitator into the collecting tank (4) provided with a layer of quartz filtrose (6) or any other suitable filtering material which allows the sulphur dioxide to pass through the same while arresting the suspended matter and the arsenic which latter may be occasionally removed through the outlet (7). The clean sulphur dioxide is passed on into the receiver (8) but is mixed on its way with highly concentrated ozone ($O_3$) which enters from its source of supply, not shown in the drawing through the pipe (9). The means for generating this ozone are not shown in the present specification but will be described in a separate application. The receiver (8) thus serves as a reservoir for the ozonized sulphur dioxide. It should be understood that all the pipes, valves, and tanks mentioned in this specification should be lead lined or made from acid proof material such as "Durr" or "Corros" iron.

Referring first to the modification illustrated in Figure 2 the ozonized sulphur dioxide ($SO_2+O_3$) which is partly transformed into sulphur trioxide due to the catalytic action of the concentrated ozone, is then passed through the catalyzer (11) which in its preferred form comprises a tube (12) connecting with the furnace (1), a heating coil (13) wound thereon and a conveyor (14) inside of the same. The latter consists of spiral portions (16) alternating with rabbles (17) and is rotated by any suitable power actuating the pulley (18). The roasted pulp from the furnace is discharged into this catalyzer and the ozonized sulphur dioxide mixed with the same while the pulp is being forwarded and stirred by the conveyor. The pulp has a catalyzing effect and binds the ozone and the sulphur dioxide permanently into sulphur trioxide ($SO_3$). The pulp and the sulphur trioxide are thereupon discharged into the tank (19) which is provided with a slotted bottom (21) over which rotates a scoop (22) which slowly feeds the pulp through the slot and allows the same to pass into the regrinder (23). The speed of the scoop (22) is timed so that there always is a substantial layer of pulp in the tank (19) which allows the sulphur trioxide mixed with the pulp to be withdrawn by means of a suction pump (24) through the pipe (26). Before entering the pipe (26) the sulphur trioxide has to pass through a hinged filtering element (27) for cleaning purposes.

The sulphur trioxide is forced into the

Cottrell acid generator (26), which is well known in the art and therefore not described in particular, where steam is introduced into the sulphur trioxide and the latter is thereby changed to sulphuric acid ($H_2SO_4$).

The pulp is reground in the grinder (23) actuated by a motor (27) or any other suitable means where the same is reduced to approximately 200 mesh.

The reduced pulp from the grinder (23) and the sulphuric acid from the acid generator are fed, together with water into the mixer (28), preferably in the following proportions:

50% pulp,
30% water,
20% of concentrated sulphuric acid;
or by way of example,
6000 lbs. of pulp,
3600 lbs. of water,
2400 lbs. of concentrated sulphuric acid.

If there is gold present in the pulp I add iron sulphate which may be stored in the tank (29), the iron sulphate serving to transform the gold in solution to the metallic state. The latter will remain in the final tailings after completion of the sulphatizing process hereinafter described together with the lead sulphates and the silica. The mixture is thoroughly agitated in the tank (28) by means of the paddles (31) or any other suitable means and conveyed to the sulphatizing furnace (32). The latter consists of a tube (33) supported on a pivot (34) which allows the same to be tilted. It is provided on the inside with a conveyor (36) consisting of spiral portions (37) alternating with rabbles (38) and on the outside with a heating coil (39) surrounded preferably with asbestos. The conveyor is actuated preferably by a motor (41) which is secured to the tube and follows its motion. Pyrometers (42) are provided to allow the operator to ascertain the temperature which should be preferably kept at about 400° F. at the starting end and at about 600° at the other end. The connections between the sulphatizer and the mixing tank (28) as well as the distributing reservoirs mentioned hereinafter should be of sufficient flexibility to allow the sulphatizer to be tilted. The latter feature is introduced to allow of adjustment of the speed with which the mixture is carried through the sulphatizer, an increased slant accelerating the movement of the material. The conveyor is preferably timed to make one revolution every two minutes and if the sulphatizer has a capacity of six tons about three hours are required for the complete sulphatizing to dryness. During this latter process the sulphides in the pulp are changed to sulphates most of which are soluble in water. If an excess of sulphuric acid was present the sulphur trioxide generated during the operation is discharged into a second Cottrell acid generator (43) where the same is again changed to sulphuric acid and stored in the tank (44) from where it may be withdrawn and used over again or sold as a commercial product. The sulphatized products are conveyed into the tank (46) where they are mechanically agitated in boiling water until all the soluble sulphates are in solution. The mixture is then filtered preferably by a continuous Oliver vacuum and the filtrate treated for the separation of the metals in solution by a well known process either as metals or as metallic salts.

The silver in solution is precipitated by sponge copper or by sodium chloride and the silver is recovered by filtering and melted into bars. The second filtrate is treated by metallic iron which will precipitate the copper and antimony if present and the precipitates are treated with nitric acid which causes the copper to dissolve while the antimony remains. The latter may be removed and the solution distilled to recover the nitric acid whereupon copper sulphate may be produced by the addition of a small amount of sulphuric acid. The antimony may be melted and transferred to other commercial products. If any zinc is present the same is recovered from the mother solution by first crystallizing out the bulk of the iron as iron sulphate by then removing the remainder of the iron by milk of lime and bleaching powder and precipitating the zinc by sodium carbonate which will produce a commercial zinc carbonate used in the manufacture of rubber. The iron obtained during this process is converted to iron oxide.

The lead sulphates in the tailings are recovered by a hot brine leaching (as a lead chloride solution) which can be used to make lead arsenate, arsenide or the lead may be recovered by an electric process as sponge lead and melted into bars.

The final tailings if gold or some of the silver is present are subject to amalgamation or cyanided by well known processes. The arsenic which is separated by the Cottrell precipitator (2) and collected in the collector (4) is subjected to sublimation which produces a No. 1 arsenic trioxide representing considerable commercial value.

In the modified form shown in Figure 1 a different catalyzer is shown. In this form, which otherwise does not distinguish from that shown in Figure 2 the roasted pulp is not used as a catalyzing agent but is transferred directly through the pipe (51) from the roasting furnace (1) to the regrinder (23) while the ozonized sulphur dioxide ($SO_2+O_3$) is drawn by means of the suction blower (24) from the receiver (8) through the catalyzer (52) into the Cottrell acid generator (26). The catalyzer (52) consists of a tube (53), a heating coil (54) wound thereon which is preferably surrounded by asbestos and is filled with fine thoroughly oxidized iron shavings. The ozone in the mixture has strong oxidizing properties and as a result the oxidized iron is continuously replaced by the action of the ozonized sulphur dioxide, at the same time acting as a catalyzer. The temperature is preferably kept at from 400 to 600° F. whereby the ozonized sulphur dioxide is converted into sulphur trioxide to be reduced to sulphuric acid in the Cottrell acid generator (26). Chromic oxide in lumps or granulated may be substituted as a catalyzer for the iron oxide. In the latter case all traces of arsenic must be removed before the sulphur dioxide enters the catalyzer since arsenic will destroy the catalytic effect.

I claim:

1. The process for treating sulphide ores and concentrates which includes the roasting of the said material to produce sulphur dioxide, the introduction of ozone into the latter and the passing of the mixture through a catalyzing agent.

2. The process for treating sulphide ores and concentrates which includes the roasting of the said material to produce sulphur dioxide, the introduction of ozone into the latter and the passing of the mixture through the roasted material as a catalyzing agent.

3. The process for treating sulphide ores and concentrates which includes the roasting of the said material to produce sulphur dioxide, the introduction of ozone into the latter and the passing of the mixture through the roasted material as a catalyzing agent while agitating the latter.

4. The process of treating sulphide ores and concentrates which includes the roasting of the said material to produce sulphur dioxide, the introduction of ozone into the latter and the simultaneous passing of the ozonized sulphur dioxide and the roasted material through a heated vessel for the production of sulphur trioxide, with the roasted material acting as a catalyzer.

5. The process of treating sulphide ores and concentrates which includes the roasting of the said material to produce sulphur dioxide, the introduction of ozone into the latter, the simultaneous passing of the ozonized sulphur dioxide and the roasted material through a heated vessel for the production of sulphur trioxide, with the roasted material acting as a catalyzer, and the separation of the trioxide from the roasted material by suction.

6. The process of treating sulphide ores and concentrates which includes the roasting of the said material to produce sulphur dioxide, the ozonizing of the latter in the presence of a catalytic agent for the production of sulphur trioxide and the steaming of the latter to produce sulphuric acid.

7. The process for treating sulphide ores and concentrates which includes the roasting of the said material to produce sulphur dioxide, the introduction of ozone into the latter and the passing of the mixture through metallic oxide with the latter acting as a catalyzing agent and the ozone as an oxidizing agent for the former.

MICHEL DE KEYSER.